United States Patent
Li et al.

(10) Patent No.: US 10,753,726 B2
(45) Date of Patent: Aug. 25, 2020

(54) SYSTEM AND METHOD FOR 3D PROFILE DETERMINATION USING MODEL-BASED PEAK SELECTION

(71) Applicant: Cognex Corporation, Natick, MA (US)

(72) Inventors: David Y. Li, West Roxbury, MA (US); Li Sun, Sudbury, MA (US); Lowell D. Jacobson, Grafton, MA (US); Lei Wang, Wayland, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 15/934,766

(22) Filed: Mar. 23, 2018

(65) Prior Publication Data

US 2019/0101376 A1    Apr. 4, 2019

Related U.S. Application Data

(60) Provisional application No. 62/476,850, filed on Mar. 26, 2017.

(51) Int. Cl.
  *G01B 11/03*  (2006.01)
  *G06T 7/521*  (2017.01)
  (Continued)

(52) U.S. Cl.
  CPC ............... *G01B 11/03* (2013.01); *G06T 7/521* (2017.01); *G06T 7/596* (2017.01); *G06T 11/00* (2013.01);
  (Continued)

(58) Field of Classification Search
  CPC ..... G01B 11/03; G01B 11/24; G01B 11/2518; G06T 7/521; G06T 11/00;
  (Continued)

(56) References Cited

U.S. PATENT DOCUMENTS

| 5,877,491 A | 3/1999 | Pryor |
| 6,441,908 B1 | 8/2002 | Johnston |

(Continued)

FOREIGN PATENT DOCUMENTS

| DE | 4341227 | 6/1995 |
| DE | 102009017465 | 10/2010 |
| KR | 20140090620 A | 7/2014 |

OTHER PUBLICATIONS

Park et al., Multi-Peak Range Imaging for Accurate 3D Reconstruction of Specular Objects, The 6th Asian Conference on Computer Vision, 2004.

(Continued)

*Primary Examiner* — Maurice C Smith
(74) *Attorney, Agent, or Firm* — Loginov & Associates, PLLC; William A. Loginov (57) ABSTRACT

This invention provides a system and method for selecting the correct profile from a range of peaks generated by analyzing a surface with multiple exposure levels applied at discrete intervals. The cloud of peak information is resolved by comparison to a model profile into a best candidate to represent an accurate representation of the object profile. Illustratively, a displacement sensor projects a line of illumination on the surface and receives reflected light at a sensor assembly at a set exposure level. A processor varies the exposure level setting in a plurality of discrete increments, and stores an image of the reflected light for each of the increments. A determination process combines the stored images and aligns the combined images with respect to a model image. Points from the combined images are selected based upon closeness to the model image to provide a candidate profile of the surface.

20 Claims, 5 Drawing Sheets

(51) Int. Cl.
*H04N 5/235* (2006.01)
*G06T 11/00* (2006.01)
*G06T 17/00* (2006.01)
*G06T 7/593* (2017.01)

(52) U.S. Cl.
CPC ............ *G06T 17/00* (2013.01); *H04N 5/2353* (2013.01); *G06T 2207/10016* (2013.01); *G06T 2207/10144* (2013.01)

(58) Field of Classification Search
CPC ........ G06T 2207/10144; G06T 3/0075; H04N 5/2353; G06K 9/00214
See application file for complete search history.

(56) References Cited

U.S. PATENT DOCUMENTS

| | | | |
|---|---|---|---|
| 6,459,509 B1 | 10/2002 | Maciey | |
| 6,531,707 B1* | 3/2003 | Favreau | G01N 21/8901 250/559.46 |
| 7,400,415 B2 | 7/2008 | Patzwald | |
| 7,460,250 B2 | 12/2008 | Keightley | |
| 7,515,280 B2 | 4/2009 | Emtman | |
| 8,379,218 B2 | 2/2013 | Deck | |
| 8,552,361 B2 | 10/2013 | Mandro | |
| 8,805,643 B2 | 8/2014 | Takimasa | |
| 9,131,219 B2 | 9/2015 | Doucet et al. | |
| 9,413,981 B2* | 8/2016 | Negro | H04N 5/2356 |
| 9,488,469 B1 | 11/2016 | Michael | |
| 9,532,029 B2 | 12/2016 | Pallone et al. | |
| 9,607,408 B2* | 3/2017 | Furches | G06T 11/00 |
| 2006/0017936 A1 | 1/2006 | Cantin et al. | |
| 2010/0141792 A1 | 6/2010 | Arai | |
| 2010/0166294 A1* | 7/2010 | Marrion | G06K 9/00214 382/154 |
| 2012/0249830 A1* | 10/2012 | Tsubaki | G06T 5/008 348/229.1 |
| 2013/0132038 A1* | 5/2013 | Regan | G06F 17/50 703/1 |
| 2014/0152794 A1* | 6/2014 | Takahashi | G01B 11/24 348/79 |
| 2015/0176983 A1 | 6/2015 | Schick | |
| 2017/0069098 A1* | 3/2017 | Johannesson | G01B 11/2518 |
| 2018/0130224 A1* | 5/2018 | Hoelscher | G06T 17/20 |

OTHER PUBLICATIONS

Park et al., 3D Modeling of Optically Challenging Objects; IEEE Transactions on Visualization and Computer Graphics, vol. 14, No. 2, Mar./Apr. 2008.

* cited by examiner

SYSTEM AND METHOD FOR 3D PROFILE DETERMINATION USING MODEL-BASED PEAK SELECTION

FIELD OF THE INVENTION

This invention relates to vision systems using one or more three-dimensional (3D) vision system camera(s) (also termed "displacement sensor(s)" or "profilers"), and more particularly to determination of a 3D (height) profile on an object surface.

BACKGROUND OF THE INVENTION

In manufacturing and assembly processes, it is often desirable to analyze an object surface to determine the nature of features and/or irregularities. The displacement (or "profile") of the object surface can be determined using a machine vision system (also termed herein "vision system") in the form of a laser displacement sensor (also termed a laser beam "profiler"). A laser displacement sensor captures and determines the (three dimensional) profile of a scanned object surface using a planar curtain or "fan" of a laser beam. In a conventional arrangement, a vision system camera assembly is oriented to view the plane of the beam from outside the plane. This arrangement captures the profile of the projected line (e.g. extending along the physical x-axis) on the object surface, which, due to the baseline (i.e. the relative spacing along the y-axis) between the beam plane and the camera causes the imaged line to appear as varying in the image y axis direction as a function of the physical z-axis height of the imaged point (along the image x axis). This deviation represents the profile of the surface in the x-z plane, which is derived from the x-y position of individual image points using appropriate calibration parameters within the displacement sensor. Laser displacement sensors are useful in a wide range of inspection and manufacturing operations where the user desires to measure and characterize surface details of a scanned object via triangulation. A typical laser displacement sensor uses a vision system camera having a lens assembly and image sensor (or "imager") that can be based upon a CCD or CMOS design. The imager defines a predetermined field of grayscale or color-sensing pixels on an image plane that receives focused light from an imaged scene through a lens/optics.

In certain vision system implementations, a plurality of displacement sensors (e.g. laser profilers) are mounted together to extend the overall field of view (FOV) (wherein the term "field of view" refers to measurement range) of the vision system so as to fully image a desired area of the object (e.g. its full width) with sufficient resolution.

It can be challenging to read a projected line on the surface of an object of interest that is made of materials with different optical properties and/or has a structured surface that can cause internal reflection. For example, surfaces can include opaque regions, specular regions, translucent/transparent regions or a combination of such, which reflect differently, and depending upon their relative angles, can also produce internal reflections. The former case is challenging because choosing a single exposure setting to accommodate all materials is problematic, while the latter case is challenging because the internal reflection can confuse the displacement sensor as to the actual profile.

SUMMARY OF THE INVENTION

This invention overcomes disadvantages of the prior art by providing a system and method for selecting the correct profile from a range of peaks generated by analyzing a surface with multiple exposure levels applied at discrete intervals. The cloud of peak information is resolved by comparison to a model profile into a best candidate to represent an accurate representation of the object profile.

In an illustrative embodiment, a system and method system for determining a profile on a surface of an object is provided, and includes a displacement sensor that projects a line of illumination on the surface and receives reflected light at a sensor assembly at a set exposure level. A processor varies the exposure level setting in a plurality of discrete increments, and stores an image of the reflected light for each of the increments. A determination process combines the stored images and aligns the combined images with respect to a model image. Points from the combined images are selected based upon proximity/closeness to the model image to provide a candidate profile of the surface. Illustratively, the exposure level comprises a laser intensity level, gain, exposure time and/or aperture. The surface can define, at least in part, at least one of specularity and translucence. The points in the combined images are illustratively organized into columns along an x dimension and weighted by intensity along a z dimension. The points can be weighted based upon a 2D kernel arranged in accordance with a predetermined statistical technique. For example, the 2D kernel can comprise at least one of a Gaussian kernel, a step or uniform kernel, a triangle kernel, a biweight kernel and an Epanechnikov kernel, among others. A point in each column is selected for the candidate profile based upon a proximity to a corresponding point in the model image. The model image can be based upon an actual image of an object surface or a synthetically generated (e.g. CAD) profile. Illustratively, peak point detection (selection) parameters can comprise at least one of a contrast threshold, intensity threshold and width of the line of illumination observed on the surface by the sensor assembly.

BRIEF DESCRIPTION OF THE DRAWINGS

The invention description below refers to the accompanying drawings, of which.

DETAILED DESCRIPTION

Figure 1:
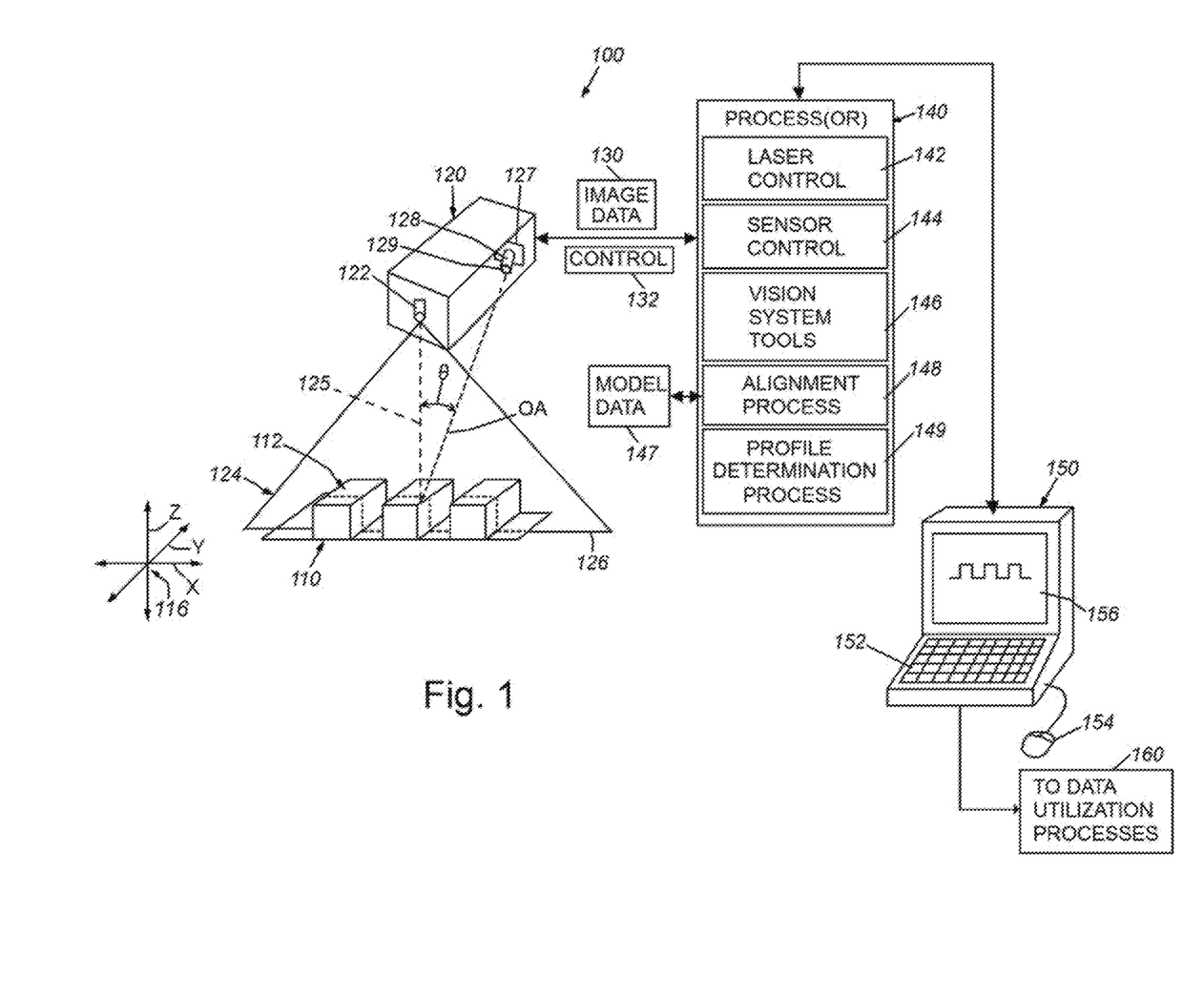
FIG. 1 is a diagram of an overall vision system arrangement acquiring an image of an object and processing the image data from a plurality of exposure levels according to an illustrative embodiment.

Reference is made to FIG. 1, which shows an overall vision system arrangement 100 used to determine the profile of an exemplary object of interest 110 according to an illustrative embodiment. The arrangement 100 is exemplary of a wide range of possible implementations. By way of non-limiting example, a displacement sensor 120 measures the surface 112 of the object at an appropriate location thereon. The displacement sensor 120 in this example includes an illumination source 122, which projects a visible or near-visible laser beam in the form of a fan (for example using an appropriate optics assembly) 124 that defines a line on the surface 112. An arbitrary 3D coordinate set (e.g. Cartesian, x, y and z-axes) 116 is shown with the line extending along the x-axis. A camera assembly 128, including an image sensor 127 and optics 129 is oriented to define an optical axis OA at an acute angle Θ with respect to the plane of the fan 124 (represented by dashed center line 125). This angle Θ causes the line to appear in the 2D sensor as an offset along its y-axis as a function of the z-height. The displacement sensor 120 is calibrated so that variation along the y-direction represents a specific z-height variation in its transmitted image data 130.

The image data 130 is provided to a vision system process(or) 140 that can be integrated with the housing of the displacement sensor, or can be entirely, or partially instantiated on a computing device 150, such as the depicted PC with user interface (keyboard 152, mouse 154 and display/touch screen 156). This PC is exemplary of a wide range of processing devices including customized processors (e.g. FPGAs) and other general purpose computing devices, laptops, tablets, smartphones, etc. The processor includes a plurality of functional modules or processes/ors handled by an appropriate operating system. For example, control 132 of the laser 122 (e.g. on/off/intensity) and the sensor assembly 128 are provided, respectively by process modules 142 and 144. The processor 140 also includes various vision system tools 146, such as edge detectors, blob analyzers, contrast tools, etc. that can be used to identify features in an image and assist in alignment of runtime image data to stored template or model data 147. This is performed by the alignment process module 148. The process(or) 140 includes a generalized profile determination module 149 that determines the closest profile candidate(s) aligned image data.

Optionally, the candidate profile(s) are provided to downstream utilization processes and/or devices in accordance with block 160. For example, profile information can be used to determine defects, quality or type of object.

Figure 2:
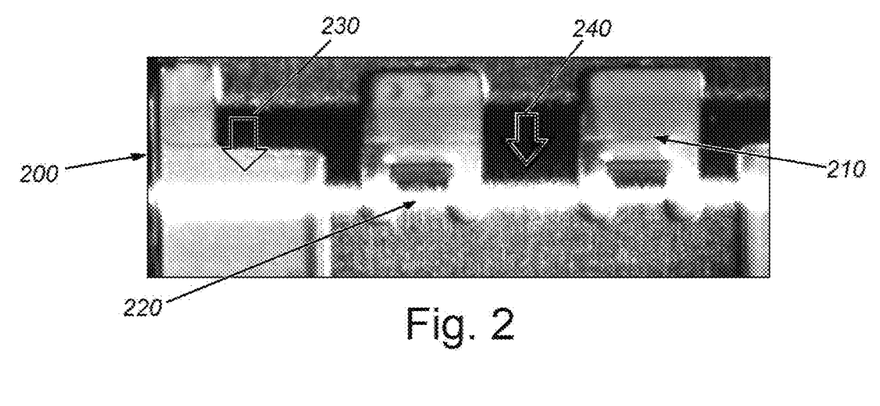
FIG. 2 is an exemplary image of an object surface showing an illumination line of a displacement sensor in a partially overexposed state at a first exposure level.
Figure 3:
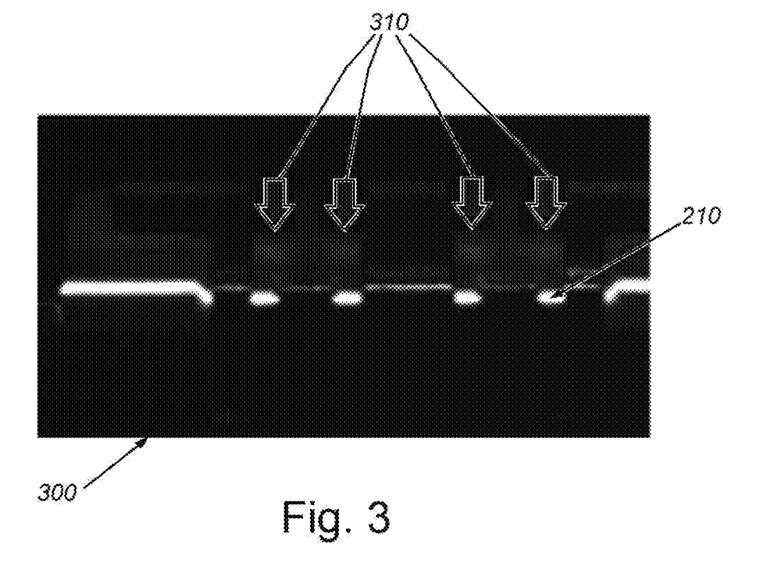
FIG. 3 is an exemplary image of the object surface of FIG. 2, showing the illumination line of the displacement sensor at a second exposure level in which undesired internal reflections are visible.

With reference now to FIG. 2, an exemplary image 200 of an object 210 is shown in which a projected illumination (e.g. visible laser) line 220 is present. Note that the current exposure level causes the line 220 in left region (arrow 230) of the object 210 to appear more exposed than the right region (arrow 240) of the object 210. Therefore, the left region (230) requires a lower exposure level than the right region (240) to produce an overall acceptable 3D profile image (i.e. with a crisp, consistent line). Other parts of the image can benefit from further differences in exposure level. It is often impractical to set a single exposure level that provides an overall desired line reflection. Thus, when applying a lower exposure level to the same object 210 (as in FIG. 2) the image 300 of FIG. 3 shows a resulting profile line that is relatively uniform. However, the lower exposure image 300 now also reveals blurry blobs, denoted by arrows 310. These blobs 310 are now relatively prominent in the image 300, and are caused by internal reflections. In analyzing the profile, these blobs 310 would tend to confuse the displacement sensor processor and appear as a second (false) profile.

Figure 4:
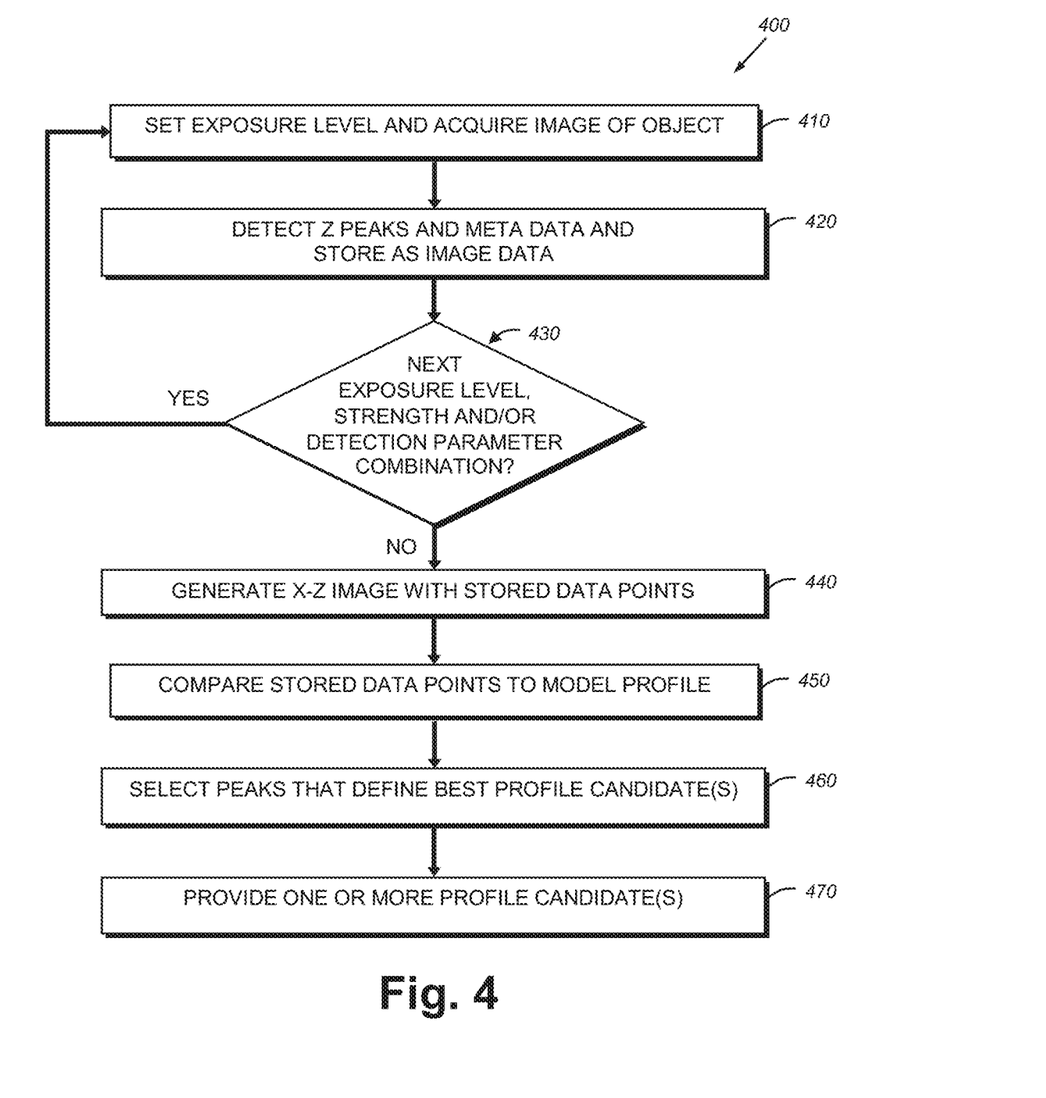
FIG. 4 is a flow diagram of an image acquisition and profile determination process according to an illustrative embodiment.

Referring now to FIG. 4, an overall, generalized procedure 400 for determining a high quality profile for an object surface is shown. The procedure sets an initial exposure level and acquires an image in step 410. The term "exposure level" as defined herein refers to one or more variable (controllable) characteristics/parameters that essentially define the amount of light (photons) that strike the image sensor (127 in FIG. 1). By way of non-limiting example, these characteristics/parameters can include (shutter) exposure time (in e.g. microseconds), gain, lens aperture, laser line intensity, and line wavelength. As described below, the internal calibration process of the displacement sensor translates y-axis displacement of the line into a z-axis height value. For a given exposure level, in step 420, the procedure 400 detects the Z-axis peaks and associated metadata and stores this information as image data. In decision step 430, the procedure 400 determines if there is a next exposure level, strength, and/or other detection parameter combination to be provided, if so, then this next level is incremented in the hardware/software of the displacement sensor (or external illuminator, etc.) and steps 410 and 420 repeat. A store of peak images is created until all exposure levels, strengths and/or detection parameter combinations have been used to acquire images of the object surface. The decision step 430 then branches to step 440 in which an overall x-z image is generated with the stored data points. This image is compared to a stored model profile in step 450 and peaks that define the best profile candidate(s) are chosen in step 460. The procedure 400 then outputs the candidate(s) in step 470. The candidate(s) can be used by downstream processes for various manufacturing, inspection and other tasks by transmitting them over a link to a processing system.

Figure 5:
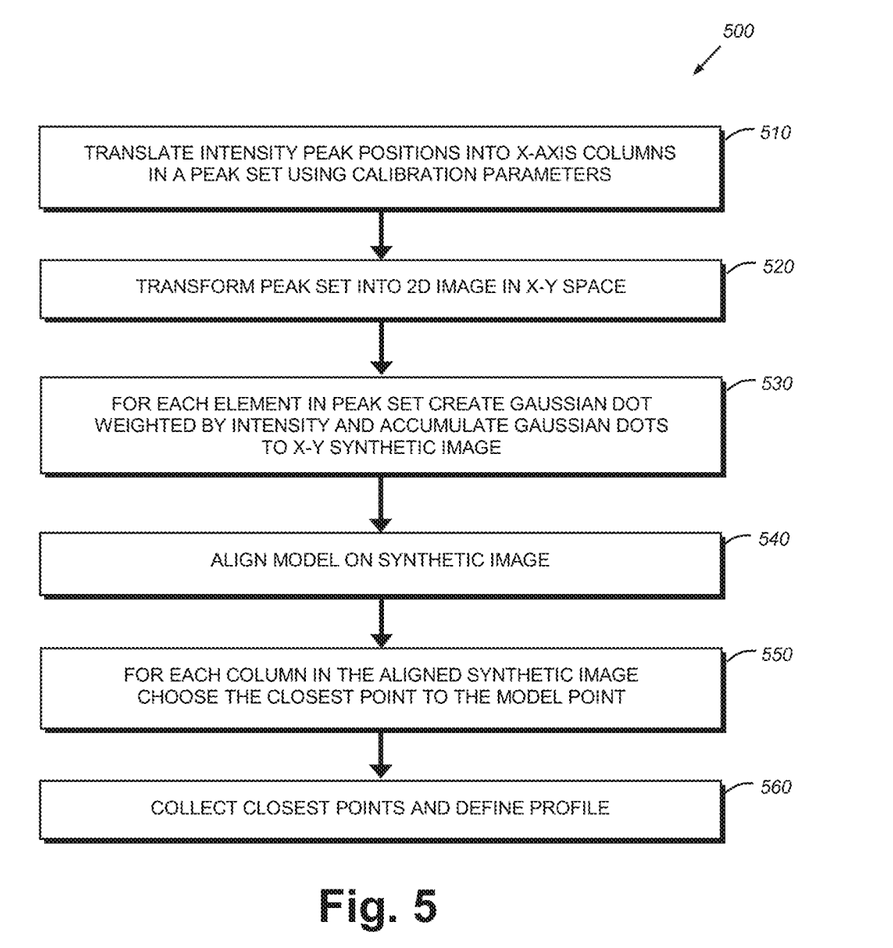
FIG. 5 is a more detailed flow diagram of the acquisition and determination process according to FIG. 4.
Figure 6:
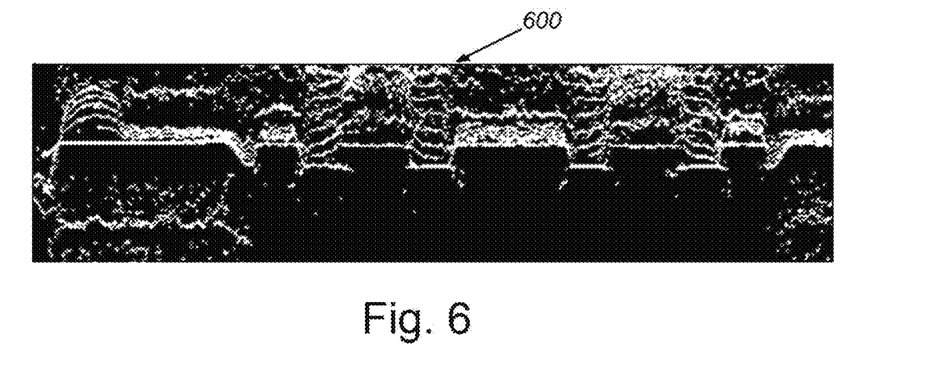
FIG. 6 is an exemplary image of the object surface of FIG. 2 showing the generation of a synthetic image with the depicted horizontal axis as the x axis and the depicted vertical axis as z axis, in which points are weighted in accordance with a Gaussian kernel.

With reference to the more detailed procedure 500 of FIG. 5, having acquired images of the (e.g.) static object surface at differing exposure levels (steps 410-430 in FIG. 4), the procedure generates a "synthetic" 2D image. In step 510 all intensity peak positions are collected for all columns in all profile images into a peak set P of size N, and the N peaks are transformed in P into a set of 2D points P' of size N in the actual x-z space using the displacement sensor's calibration parameters (step 520). Reference is made to the synthetic image 600 in FIG. 6, which shows a 2D plot of all the points in P' for the exemplary object surface 210 described above. Note that the image appears as a "cloud" of points that covers a range of (vertical) z positions for every (horizontal) x location. Within the synthetic image 600, with horizontal axis as x axis and vertical axis as z axis, the procedure 500 (in step 530) accumulates a 2D kernel (e.g. a Gaussian kernel) with a weight (calculated with a function on the intensity value of the corresponding peak in set P) for each point p in set P'. Note that a variety of statistical methods can be used to produce the weighted 2D kernel in addition to a Gaussian distribution—e.g. cross-correlation, etc. Note also that the use of a Gaussian kernel is by way of example of a variety of kernel types, including a step or uniform kernel, a triangle kernel, a biweight kernel, an Epanechnikov kernel, and/or other appropriate statistical arrangements.

This weighted synthetic image is then aligned in procedure step 540 to model profile data using appropriate vision system alignment tools. More particularly, the procedure reconstructs the 3D profile of the object surface by aligning the 2D synthetic image relative to a model that can be based upon a trained (acquired) image of a model object surface and/or can be synthetically defined using (e.g.) a CAD system. In step 550, for each column (x position), the procedure choses the point p in set P' with the same x coordinate that is the closest to the aligned model at x. Then, in step 560, the procedure collects all the selected p in the step 550, and the collective is the reconstructed 3D profile.

Figure 7:
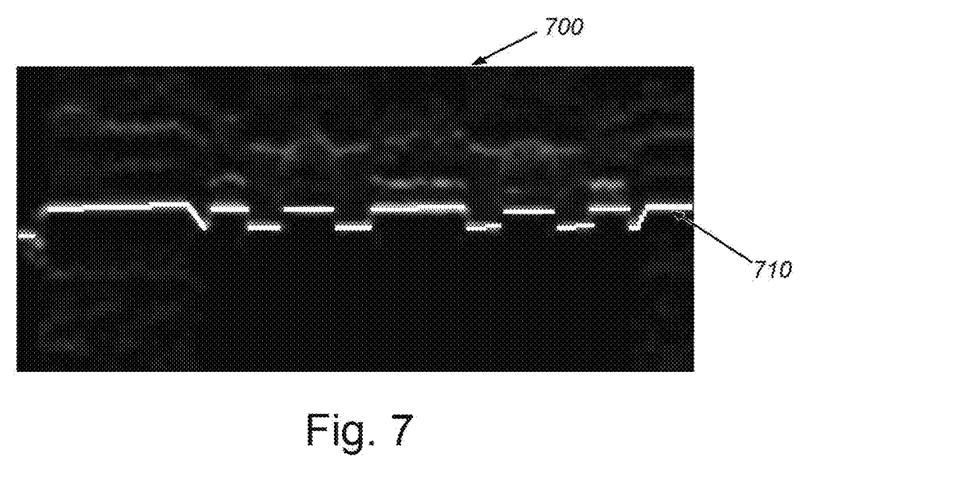
FIG. 7 is an exemplary image of the object surface of FIG. 2 showing a determined profile line based upon the synthetic image and aligned model data.

Using the procedures 400 and 500, an exemplary image 700 with a well-defined set of peaks 710 can be delineated. These true peaks are stored as a profile candidate for the surface. In various embodiments, more than one candidate can be stored where the procedure generates a plurality of possible reconstructed profiles. However, the alignment of model data with the acquired runtime image data will tend to avoid a multiplicity of possible profiles. A defect of variation in the (runtime) surface under inspection from that of the model could potentially allow for multiple profiles as the defect creates a region that may not match any model data.

It is contemplated that the user interface can include various functions that specify the types of parameters (or combinations of parameters) to be controlled depending upon the nature of the object surface—for example, some surfaces can be more effectively imaged by varying sensor gain, while other surfaces can be more effectively imaged by varying sensor exposure time.

It should be clear that the system and method described above provides an effective way for a displacement sensor to account for object surfaces that are not accommodating to a single exposure level (e.g. faceted surfaces, specular surfaces and/or transparent/translucent surfaces) when generating a profile. This system and method allows for a variety of parameters to be controlled within the sensor and the surrounding environment, and can adapt to a wide range of surface types.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A system for determining a profile on a surface of an object comprising:
   a displacement sensor that projects a line of illumination on the surface and receives reflected light at a sensor assembly at a set exposure level;
   a processor that varies the exposure level setting in a plurality of discrete increments, and that stores an image of the reflected light for each of the increments; and
   a determination process that combines the stored images and that aligns the combined images with respect to a model image, wherein points from the combined images are selected based upon proximity to the model image to provide a candidate profile of the surface.

2. The system as set forth in claim 1 wherein the exposure level comprises a laser intensity level.

3. The system as set forth in claim 1 wherein the exposure level comprises at least one of gain, exposure time and aperture at the sensor assembly.

4. The system as set forth in claim 1 wherein the surface defines at least in part, at least one of specularity and translucence.

5. The system as set forth in claim 1 wherein points in the combined images are organized into columns along an x dimension and weighted by intensity along a z dimension.

6. The system as set forth in claim 5 wherein the points are weighted based upon a 2D kernel arranged in accordance with a predetermined statistical technique.

7. The system as set forth in claim 6 wherein the 2D kernel comprises at least one of a Gaussian kernel, a step or uniform kernel, a triangle kernel, a biweight kernel and an Epanechnikov kernel.

8. The system as set forth in claim 7 wherein a point in each column is selected for the candidate profile based upon a proximity to a corresponding point in the model image.

9. The system as set forth in claim 6 wherein peaks in the points are selected using peak detection parameters, the parameters comprising at least one of a contrast threshold, intensity threshold and width of the line of illumination observed on the surface by the sensor assembly.

10. The system as set forth in claim 5 wherein a point in each column is selected for the candidate profile based upon a proximity to a corresponding point in the model image.

11. The system as set forth in claim 1 wherein the model image is based upon an actual image of an object surface or a synthetically generated profile.

12. A method for determining a profile on a surface of an object comprising the steps of:
    projecting a line of illumination on the surface and receiving reflected light at a sensor assembly at a set exposure level;
    varying the exposure level setting in a plurality of discrete increments and respectively storing an image of the reflected light for each of the increments;
    combining the stored images and aligning the combined images with respect to a model image; and
    selecting points from the combined images based upon proximity to the model image to provide a candidate profile of the surface.

13. The method as set forth in claim 12 wherein the step of varying the exposure level comprises varying at least one of a laser intensity level, sensor gain, exposure time and aperture at the sensor assembly.

14. The method as set forth in claim 12 wherein points in the combined images are organized into columns along an x dimension and weighted by intensity along a z dimension.

15. The method as set forth in claim 14 wherein the points are weighted based upon a 2D kernel arranged in accordance with a predetermined statistical technique.

16. The method as set forth in claim 15 wherein the 2D kernel comprises at least one of a Gaussian kernel, a step or uniform kernel, a triangle kernel, a biweight kernel and an Epanechnikov kernel.

17. The method as set forth in claim 16 further comprising selecting a point in each column for the candidate profile based upon a proximity to a corresponding point in the model image.

18. The method as set forth in claim 14 further comprising selecting peaks in the points using peak detection parameters that comprise at least one of a contrast threshold, intensity threshold and width of the line of illumination observed on the surface by the sensor assembly.

19. The method as set forth in claim 12 wherein the model image is based upon an actual image of an object surface or a synthetically generated profile.

20. A system for determining a profile on a surface of an object comprising:
   a displacement sensor that projects a line of illumination on the surface and receives reflected light at a sensor assembly at a set exposure level;
   a processor that varies the exposure level setting in a plurality of discrete increments, and that stores an image of the reflected light for each of the increments; and
   a determination process that combines the stored images to generate a 2D image therefrom and that aligns the 2D with respect to a model image.

* * * * *